Figure 1:
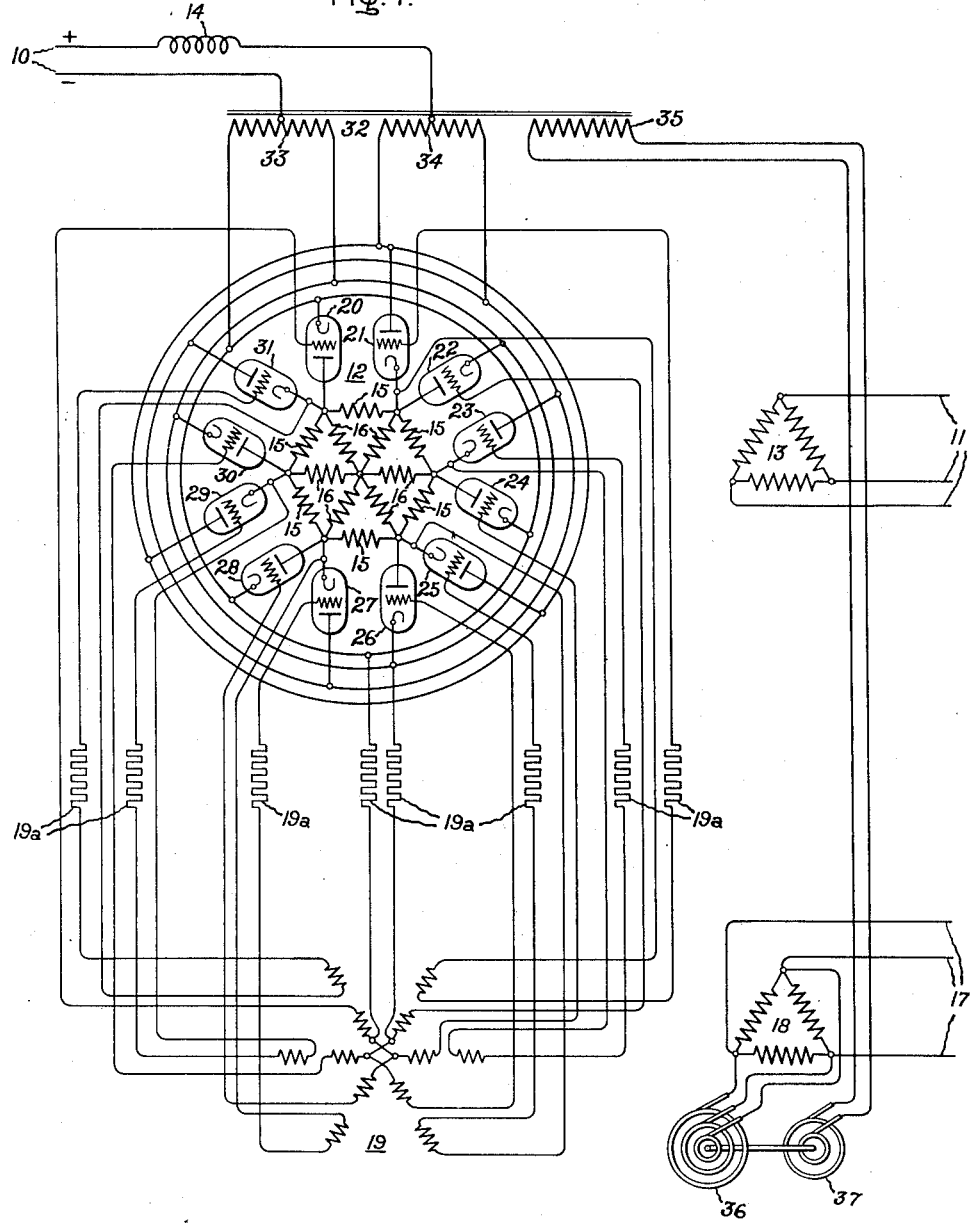

Oct. 10, 1933.   C. H. WILLIS   1,929,723
ELECTRIC VALVE CONVERTING APPARATUS
Filed Oct. 1, 1931   2 Sheets-Sheet 1

Inventor:
Clodius H. Willis,
by Charles E. Mullan
His Attorney.

Oct. 10, 1933.  C. H. WILLIS  1,929,723

ELECTRIC VALVE CONVERTING APPARATUS

Filed Oct. 1, 1931  2 Sheets-Sheet 2

Inventor:
Clodius H. Willis,
by Charles V. Tullar
His Attorney.

Patented Oct. 10, 1933

1,929,723

UNITED STATES PATENT OFFICE 1,929,723

ELECTRIC VALVE CONVERTING APPARATUS

Clodius H. Willis, Princeton, N. J., assignor to General Electric Company, a corporation of New York Application October 1, 1931. Serial No. 566,369

12 Claims. (Cl. 175—363)

My invention relates to electric valve converting apparatus and more particularly to such apparatus adapted to transmit energy between direct and alternating current circuits.

Heretofore there have been devised numerous apparatus including electric valves for transmitting energy between direct and alternating current circuits. When transmitting energy from a direct current supply circuit to a polyphase alternating current load circuit, it has been customary to provide an inductive coupling between the circuits comprising a plurality of transformer windings connected in ring, or mesh, or in star formation. In the majority of cases it is desired to transmit energy to a three phase alternating current circuit so that the transformer windings are connected in either Y or delta. However, when supplying current to an alternating current circuit which is not connected to an independent source of electromotive force for determining its frequency, wave form, and the phase relations of its polyphase voltages and currents, it has been found that an excessive amount of commutating voltage is required to transfer the current between the successive electric valves. This is due to the fact that, since the direct current enters a single point of the polyphase network and emerges from a diametrically opposite point of the network, the two halves of the network on each side of this axis of conduction act like parallel connected single phase networks. Under this condition, the normal phase relations between the voltages of the several windings of the network collapse so that the voltage of the windings interconnecting successive valves which must be counteracted to commutate the current between these valves becomes the full linear voltage drop in these windings rather than the axial component of a voltage vector displaced in phase with respect to the axis of conduction.

It is an object of my invention, therefore, to provide an improved electric valve converting apparatus for transmitting energy from a direct current circuit to a polyphase alternating current circuit, the phase relations of the voltages of which are not independently fixed, in which the voltage required to commutate the current between the successive valves is materially reduced.

It is another object of my invention to provide an improved electric valve converting apparatus for transmitting energy from a direct current circuit to a polyphase alternating current circuit, the phase relations of the voltages of which are not independently fixed, in which the phase relation of the voltages of the several windings of the inductive network are substantially fixed by the connections of the network itself.

It is a further object of my invention to provide an improved electric valve converting apparatus for transmitting energy from a direct current circuit to a three phase alternating current circuit in which the connections between the circuits are equivalent to a greatly increased number of phases and are obtained by the use of only three transformers energized from the respective phases of the alternating current circuit, in order that the voltage required to commutate the current between the successive valves may be materially reduced.

In accordance with my invention, my improved electric valve converting apparatus includes a polyphase network of transformer windings which comprise the output transformer of the direct current side of the converting apparatus and the input transformer of the alternating current side of the apparatus. The transformer windings comprising the output transformer of the direct current side of the apparatus are connected to form a plurality of geometrically rigid polygons, such, for example, as a series of interconnected triangles. In accordance with certain modifications of my invention, the windings are connected to form a combination of a plurality of triangles and other geometrically rigid figures, such, for example, as other polygons provided with cross connections, braces, etc., to maintain the transformer network geometrically rigid. It has been found that, with such an arrangement, the phase relations of the voltages of the several windings remain substantially fixed in polyphase relation and that the voltage required to commutate the current between successive valves is materially reduced. In order to reduce still further the voltage necessary to commutate the current between the valves, the effective number of phases of the polyphase network may be increased by connecting the transformer network to include a circumscribing polygon with a plurality of cross connected internal windings, and by providing two or more terminals symmetrically disposed with respect to the neutral of the network for each of the windings of the circumscribing polygon. In certain cases the equivalent number of phases may be increased still further by providing additional terminals on certain of the cross connected windings.

Figure 2:
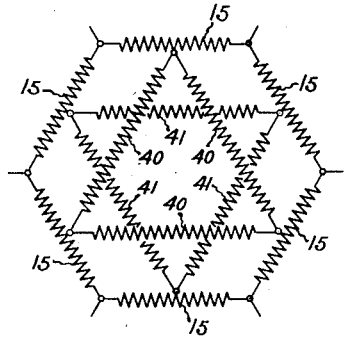
Figure 3:
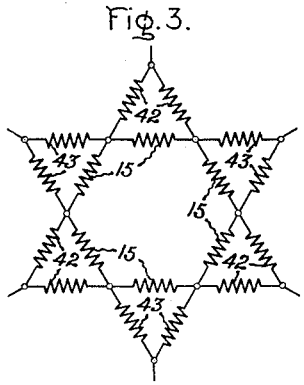
Figure 4:
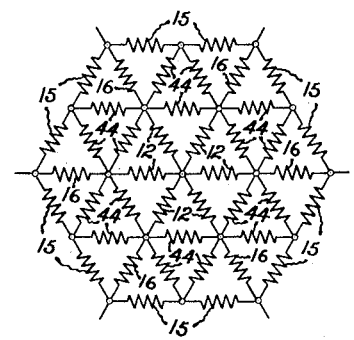
Figure 9:
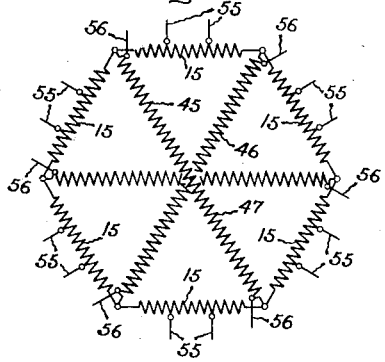

For a better understanding of my invention, together with other and further objects thereof, reference is had to the following description taken in connection with the accompanying drawings, and its scope will be pointed out in the appended claims. Fig. 1 of the accompanying drawings illustrates my invention as applied to an electric valve converting apparatus for transmitting energy to a three phase alternating current circuit in which the network of inductive windings comprises a six phase arrangement composed of a plurality of interconnected triangles; Figs. 2, 3 and 4 illustrate other geometrically rigid networks which may be utilized in my improved electric valve converting apparatus; Fig. 5, 6, 7 and 8 illustrate a number of rigid inductive networks which may be utilized to still further increase the equivalent number of phases, while Fig. 9 illustrates a network by means of which the number of phases of the alternating current circuit may be increased six times.

Referring now to Fig. 1 of the drawings, I have illustrated an arrangement for transmitting energy from a direct current circuit 10 to an independent three phase alternating current circuit 11. This apparatus comprises a transformer network 12 connected across the direct current circuit 10 through electric valves 20—31 inclusive, and an inductively coupled transformer network 13 connected to the three phase circuit 11. If desired, a smoothing reactor 14 may be connected in the direct current circuit. Valves 20—31, inclusive, are each provided with an anode, a cathode and a control grid, and may be of any of the several types well known in the art, although I prefer to use valves of the vapor electric discharge type. The transformer network 12 comprises a plurality of windings 15 connected to form a regular hexagon, known in the art as a six-phase ring or mesh connection, and a plurality of windings 16 connected to form a six-phase star and interconnected with the ring connected windings 15 as illustrated, to form a geometrically rigid network of interconnected triangles. It will be understood that all windings of the networks 12 and 13 having the same phase relation may be wound on the same magnetic core or otherwise inductively coupled.

The grids of the several electric valves may be energized from any suitable source of control potential 17 by any well known connection, but I have shown by way of example a grid transformer provided with a primary winding 18 connected to the alternating current circuit 17 and six-phase star connected secondary windings 19 comprising separate insulated phase windings for exciting the several valves or groups of valves having independent cathode potentials. The grid transformer comprising the windings 18 and 19 is preferably self-saturating, or self-saturating transformers should be interposed in the connections between the windings 19 and the grids of the several electric valves or some other equivalent arrangement should be used to provide the grids of the several electric valves with an excitation of peaked wave form, since each of the electric valves is conductive for only a period of 60 electrical degrees. However, this feature of providing peaked excitation to the grids of the vapor electric discharge valves forms no part of my present invention, but is disclosed and claimed in a copending application of B. D. Bedford, Serial No. 485,335, filed September 29, 1930, and assigned to the same assignee as the present application. If desired, current limiting resistors 19a may be included in the several connections between the secondary windings 19 of the grid transformer and the grids of the several electric valves.

In order to commutate the current between the several valves under any desired power factor conditions on the alternating current circuit 11, there may be provided any of the several arrangements for introducing into the system a harmonic commutating potential disclosed and claimed in my copending applications Serial No. 566,372, and Serial No. 566,367, filed October 1, 1931. By way of example, I have illustrated a commutating transformer 32 provided with windings 33 and 34, each having an electrical midpoint connected to one side of the direct current circuit 10. The end terminals of the winding 33 are connected to the cathodes of alternate electric valves whose anodes are connected to the transformer network 12, while the end terminals of the winding 34 are connected to alternate anodes of the valves whose cathodes are connected to the network 12. The harmonic commutating potential may be supplied to the transformer 32 from any suitable source, but I have illustrated by way of example an exciting winding 35 energized from the alternating current circuit 17 through a frequency changer comprising a synchronous motor 36 connected to the alternating current circuit 17, and a synchronous generator 37.

Neglecting the harmonic excitation of the system, the general principles of operation of the above described valve converting apparatus for transmitting energy from the direct current circuit 10 to the alternating current circuit 11 will be well understood by those skilled in the art. In brief, current will flow from the upper or positive direct current terminal 10 into one of the electric valves, for example valve 21, through the transformer network 12 and electric valve 28 to the other side of the direct current circuit. Sixty electrical degrees after valves 21 and 28 have started to conduct current, electric valves 23 and 30 will be made conductive and the current will be transferred to them. In this way the current will be successively commutated between the several electric valves, each pair of valves being conductive for sixty electrical degrees. As stated above, if the inductive windings 16 are omitted and current enters the network 12 through electric valve 21, leaving it through electric valve 28, and the alternating current circuit 11 is not connected to an independent source for fixing the phase relations of the phase voltages, the regular hexagon formed by inductive windings 15, which normally represents the phase relations between the voltages of these windings, collapses. Under these conditions, the voltage of the direct current circuit 10 will be equally divided between the three windings 15 on each side of the axis of conduction, and, when it is desired to transfer current from the valve 21 to the valve 23, for example, it will be necessary to provide a commutating voltage equal to substantially one-third that of the direct current circuit 10. However, by adding the six-phase star connected windings 16, as illustrated, the collapse of the outside hexagonal ring is prevented and the instantaneous voltages of the various points of the network are so adjusted that the periodic alternating potentials appearing in the several windings 15 and 16 are fixed in substantially the desired polyphase relation. With this arrangement, only that component of the voltage of the several windings 15 along the axis of conduction need be commutated, which in the arrangement shown is only one-sixth that of the direct current circuit 10, or substantially half that when the star connected windings 16 are omitted. By still further increasing the number of phases of the network 12, this effect may be correspondingly increased so that a decreasing amount of commutating voltage need be supplied to the system.

It is well understood by those skilled in the art, that it is not ordinarily possible with this type of apparatus to supply lagging loads on the alternating current circuit 11. This is because of the fact that current must be commutated from one valve to the next successive valve at a point in the cycle when the electromotive force of the inductive winding interconnecting these two valves is in such a direction as to interrupt automatically the current in the outgoing valve and to start the current in the incoming valve; that is, when the counter-electromotive force of the winding connected to the incoming valve is less than that of the winding connected to the outgoing valve. This corresponds to a leading power factor on the alternating current circuit, so that if it is desired to supply a lagging load to the circuit 11 it becomes necessary to supply additional apparatus to furnish the lagging reactive current. In the arrangement illustrated, however, the commutating windings 33 and 34 are energized with a third harmonic alternating potential which opposes the electromotive force appearing in the network 12 between adjacent valves at the instants at which it is desired to commutate the current between them, thus enabling the current to be commutated between the several electric valves at an earlier point in the cycle of alternating current and to supply a lagging load to the alternating current circuit 11. By properly adjusting the relative amplitude of the third harmonic and the fundamental electromotive forces and maintaining the third harmonic substantially in phase with the grid potentials, it has been found possible to transmit energy from the direct current circuit to the alternating current circuit at any desired power factor from unity to substantially zero lagging. This feature is explained in more detail and broadly claimed in my above mentioned copending application, Serial No. 566,372.

In Fig. 2 there is illustrated another form of geometrically rigid inductive network which may be used in place of that shown in Fig. 1 for substantially fixing the phase relations between the voltages of the various inductive windings, as explained above. In this arrangement, a plurality of inductive windings 15 are connected to form a regular haxagon and two groups of inductive windings 40 and 41, each connected in delta, join the midpoints of the alternate windings 15 as illustrated. It has been found that such a connection of windings produces a geometrically rigid figure. In Fig. 3 the inductive windings 15 connected in the form of a regular hexagon comprise the middle section of two groups of windings 42 and 43 each connected in delta and interconnected to form a symmetrical star. Fig. 4 is similar to Fig. 1 with the exception that each of the triangles of Fig. 1 is still further subdivided by the groups of windings 44, each connected in delta and joining the midpoints of the triangles formed by the windings 15 and 16.

Figure 5:
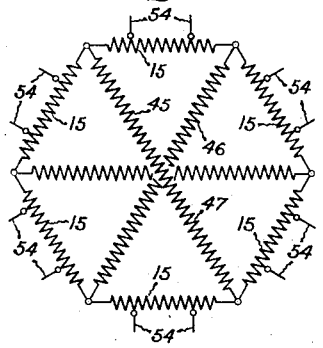
Figure 6:
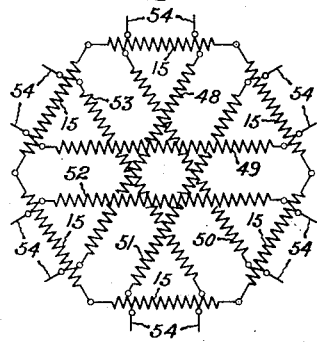
Figure 7:
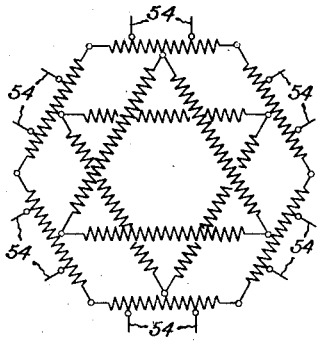
Figure 8:
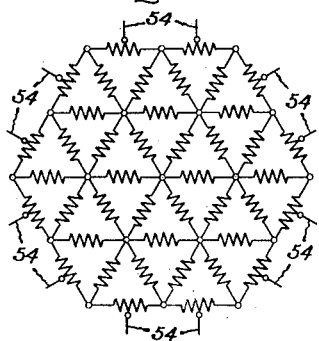

Fig. 5 is similar to Fig. 1 with the exception that the windings 45, 46 and 47 interconnecting the vertices of the hexagon formed by the windings 15 are not interconnected to provide a neutral. In the arrangement of Fig. 6 each of the windings 15 is provided with two similarly spaced intermediate terminals, the terminals of each winding being connected respectively to the non-corresponding terminals of the alternate preceding and alternate succeeding winding.

Figs. 5, 6, 7 and 8 (Figs. 7 and 8 corresponding to Figs. 2 and 4 respectively) illustrate external connections to the inductive network by means of which the equivalent number of phases may be increased to twelve. In each case the external connections are made to the windings 15 at symmetrically spaced intermediate terminals 54 of these windings. The result of this equivalent increase in the number of terminals is not only to decrease directly the commutating voltage required to transfer the current between the successive valves, but also to increase the approximation of the voltages in the several inductive windings to sinusoidal alternating voltages of the desired polyphase relation. In Fig. 9 there is shown the equivalent of an eighteen-phase transformer network obtained by the use of the arrangement of Fig. 5, in which the intermediate terminals 55 of the windings 15 are symmetrically spaced by an angle of 20 electrical degrees, while the remaining terminals necessary for the eighteen-phase connection are obtained from the intermediate terminals 56 of the windings 45, 46, and 47. The terminals 55 and 56 are symmetrically spaced with respect to the electrical neutral of the network.

While I have illustrated the alternating current circuit 11 as being a three-phase circuit, it will be obvious to those skilled in the art that any other polyphase circuit derivable by proper transformer connections from a six-phase circuit may be substituted therefor if desired. Furthermore, while I have shown a hexagon as the basic geometric figure for each of the several modifications described above, since this figure is particularly suitable for three-phase or six-phase circuits, it will be readily apparent to those skilled in the art that any other regular geometrical polygon having four or more sides may be used with circuits of the appropriate number of phases.

While I have described what I at present consider the preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a polyphase network of inductive windings interconnected to form a plurality of geometrically rigid polygons, a plurality of similarly disposed electric valves interconnecting said network and said supply circuit, and means for controlling the conductivity of said valves.

2. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a polyphase network of inductive windings interconnected to form a plurality of triangles, a plurality of similarly disposed electric valves interconnecting said network and said supply circuit, and means for controlling the conductivity of said valves.

3. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a plurality of inductive windings connected in ring or mesh formation, and a plurality of other inductive windings interconnected with said first mentioned windings to form a plurality of triangles, a plurality of similarly disposed electric valves interconnecting the terminals of said interconnected inductive windings and said supply circuit, and means for controlling the conductivity of said valves.

4. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a plurality of inductive windings connected in ring formation, and a plurality of other inductive windings inductively related to and interconnected with said first mentioned windings to subdivide said ring into a plurality of geometrically rigid polygons, a plurality of similarly disposed electric valves interconnecting the several terminals of said interconnected windings and said supply circuit, and means for controlling the conductivity of said valves.

5. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a plurality of inductive windings connected in ring formation and a plurality of other inductive windings inductively related to and interconnected with said first mentioned windings to subdivide said ring into a plurality of triangles, a plurality of similarly disposed electric valves interconnecting the several terminals of said interconnected windings and said supply circuit, and means for controlling the conductivity of said valves.

6. In combination, a direct current supply circuit, a polyphase alternating current load circuit, the phase relations of the voltages of which are not independently fixed, and apparatus for transmitting energy from said supply circuit to said load circuit and for substantially fixing the voltages of said load circuit in polyphase relation comprising a plurality of inductive windings connected to form a symmetrical polygon of an even number of sides, and a plurality of other inductive windings connecting diametrically opposite points of said polygon, a plurality of similarly disposed electric valves interconnecting the several terminals of said polygon and said supply circuit, and means for controlling the conductivity of said valves.

7. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a plurality of inductive windings connected to form a symmetrical polygon, and a plurality of other inductive windings connected in star and interconnecting the vertices of said polygon, a plurality of similarly disposed electric valves interconnecting the several terminals of said polygon and said supply circuit, and means for controlling the conductivity of said valves.

8. In an electric valve converting apparatus for transmitting energy from a direct current circuit to a polyphase alternating current circuit the phase relations of the voltages of which are not independently fixed, an inductive coupling for said circuits comprising a first group of inductive windings connected to form a symmetrical polygon, a second group of inductive windings connected in star and interconnecting the vertices of said polygon, and a third group of inductive windings connected to subdivide the triangles formed by said first two groups into smaller triangles which combine to form a symmetrical network for substantially fixing the voltages of said alternating current circuit in polyphase relation.

9. In an electric valve converting apparatus for transmitting energy from a direct current circuit to a polyphase alternating current circuit the phase relations of the voltages of which are not independently fixed, an inductive coupling for said circuits comprising a plurality of inductive windings connected to form a polygon, and a plurality of other star connected inductive windings interconnecting the vertices of said polygon for substantially fixing the voltages of said alternating current circuit in polyphase relation.

10. In an electric valve converting apparatus for transmitting energy from a direct current circuit to a polyphase alternating current circuit the phase relations of the voltages of which are not independently fixed, an inductive coupling for said circuits comprising a plurality of inductive windings connected to form a regular hexagon and two groups of other inductive windings, each group interconnecting the midpoints of alternate windings of said hexagon for substantially fixing the voltages of said alternating current circuit in polyphase relation.

11. In an electric valve converting apparatus for transmitting energy from a direct current circuit to a polyphase alternating current circuit the phase relations of the voltages of which are not independently fixed, an inductive coupling for said circuits comprising a plurality of inductive windings connected to form a regular hexagon, each of said windings being provided with a pair of symmetrically spaced intermediate terminals, and a plurality of other inductive windings connecting said terminals of each winding with the non-corresponding terminals of the alternate preceding and alternate succeeding windings respectively for substantially fixing the voltages of said alternating current circuit in polyphase relation.

12. In combination, a direct current supply circuit, a polyphase alternating current load circuit the phase relations of the voltages of which are not independently fixed, and apparatus for transmitting energy from said supply circuit to said load circuit and for substantially fixing the voltages of said load circuit in polyphase relation comprising a polyphase network of inductive windings interconnected to form a plurality of geometrically rigid polygons, a plurality of electric valves interconnecting said network and said supply circuit, and means for controlling the conductivity of said valves.

CLODIUS H. WILLIS.